(No Model.)
W. A. KONEMAN.
PROCESS OF RECOVERING PRECIOUS METALS FROM CYANID SOLUTIONS CONTAINING THEM.
No. 578,341. Patented Mar. 9, 1897.
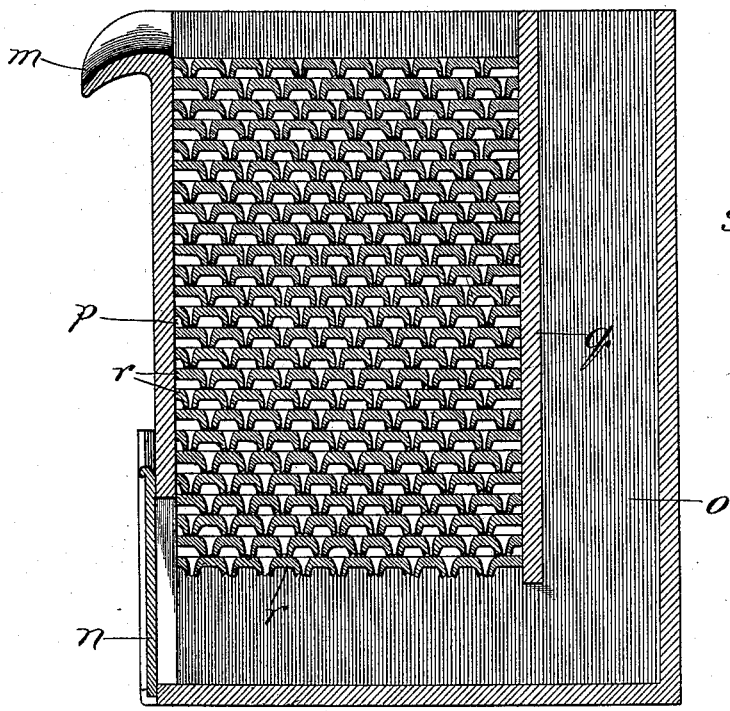

UNITED STATES PATENT OFFICE.

WILLIAM A. KONEMAN, OF CHICAGO, ILLINOIS.

PROCESS OF RECOVERING PRECIOUS METALS FROM CYANID SOLUTIONS CONTAINING THEM.

SPECIFICATION forming part of Letters Patent No. 578,341, dated March 9, 1897.

Application filed October 26, 1895. Serial No. 567,009. (No specimens.)

*To all whom it may concern:*

Be it known that I, WILLIAM A. KONEMAN, a citizen of the United States, residing at Chicago, in the county of Cook and State of Illinois, have invented a new and useful Improvement in the Process of Recovering Precious Metals from Cyanid Solutions Containing Them, of which the following is a specification.

My invention relates to an improved process of facilitating the recovery, on a commercial scale, of gold and silver, or either of them, from solutions containing the same combined with cyanogen.

A difficulty attendant upon the employment of the otherwise successful so-called "cyanid" process of extracting gold and silver from ore relates to the final production of bullion from the cyanogen-containing solution.

At the present time it is the practice to precipitate the precious metals in cyanid solutions containing them, employing either a zinc sponge for effecting the precipitation or electrolysis for precipitating the precious metal or metals upon lead plates. Of the two the zinc-sponge medium is that most commonly employed on account of its compactness and the thoroughness of its action, so far as concerns the precipitation and intercepting of the precious metals; but it involves a very troublesome and expensive procedure to recover the gold and silver, or either, and convert the same into bullion, because large quantities of the fine zinc of the sponge invariably accompany it, and it is an expensive matter to produce the filiform zinc sponge. Moreover, the zinc sponge is only adapted for use with alkaline solutions, meaning such as are obtained from salts where the cyanogen is tied to an alkali like potassium or sodium cyanid.

It appears from extensive investigations which I have made that gold and silver may be precipitated in cyanogen-containing solutions containing them in two different and distinct ways. If the solution contains an alkaline salt, the precipitation will be induced by a metal, such as zinc or aluminium, that is attacked by the alkali in the solution and which, by being so attacked, evolves nascent hydrogen. This nascent hydrogen it is then which precipitates the precious metals. If, on the other hand, the precious metals or either of them be placed in solution by gaseous cyanogen alone, (and the latter may readily be obtained by heating mercuric cyanid,) chemically pure zinc sponge will not effect the precipitation in such solution, and if zinc be employed it must be under conditions to establish electrolytic action, either by mixing or bringing it into contact with one or more other metals electronegative to zinc. In this case it is the galvanic action which does the work of precipitation.

Inasmuch as even alkaline cyanid solutions containing precious metals contain also free hydrocyanic acid, precipitation is accelerated and the chemical action is enhanced by both generating nascent hydrogen and simultaneously creating galvanic action, and it is to this double action that the superior advantages are attributable of my improvement, which involves employing as the precipitating medium zinc with or without aluminium, capable of generating nascent hydrogen in an alkaline solution, and lead, which is electronegative to the hydrogen-evolving metal or metals. It is preferred to employ these metals in the form of an alloy composed of them.

The accompanying drawing shows by a view in vertical sectional elevation an apparatus suitable for the practice of my improved process.

As a more important object of my improvement is to effect recovery of the precious metals from the solution containing them with the utmost economy, for attaining which the bullion must be produceable with ease and certainty, the selection of the mechanical agents for effecting the precipitation is a matter of great importance. Thus though galvanized iron in fine strips is greatly superior in precipitating power to pure zinc (with relation to which the iron is electronegative) the recovery of the gold and silver from it is attended with great difficulty. An alloy which I have found to be very effective for my purpose is composed of four parts of lead, one part of zinc, and one-fourth part of aluminium. This alloy generates profuse galvanic action and produces, besides, very free evolution of nascent hydrogen. To use this alloy, it may be provided in granulated or other form; or instead of an alloy the different metals may be used in contact with each other. As represented in the illustrated apparatus, the alloy of metals is in the form of perforated plates $r$, supported one above the other and spaced apart by burs formed in producing the perforations in a receptacle A of cylindrical or stand-pipe form, which may be composed of wood or analogous material and divided by a vertical partition $q$, which may also be of wood or analogous material, into two compartments $p$ and $o$, communicating at the base of the partition, the receptacle having a gate or door $n$ near its lower end and a discharge-spout $m$ near its upper end, both at the compartment $p$, in which the plates $r$ of the alloy are contained. Whatever the material used for the receptacle and partition it should be such as will not be attacked by the cyanid solution and is nonconductive of electricity.

To use this apparatus, the cyanogen-containing solution containing the gold and silver, or either precious metal, is introduced into the receptacle at the upper end of the compartment $o$, whence it passes under the partition $q$ and rises in the compartment $p$ between, through, and about the plates of alloy $r$ therein, discharging at the overflow-spout $m$.

The gold and silver which are precipitated upon the plates $r$ may be readily removed, from time to time, by brushing.

As plates $r$ become worn with use they may be removed through the door $n$ and replaced by others introduced into the compartment at its upper end. As the zinc and aluminium of the alloy are consumed, the lead which remains becomes the deposit-surface for the precipitated precious metal or metals.

If the alloy be employed in granulated or other than plate form, it may all be transferred to the melting-pot at a clean up, and the bullion may be obtained therefrom in a well-known manner by melting the alloy in an iron pot raised to a heat above the melting-point of the zinc, removing the iron and carbon dross by skimming, then cooling till the zinc rises to the surface with the precious metal or metals, and skimming off the zinc and retorting it off to recover the zinc and precious metal or metals separate from each other.

The zinc, when combined with a large proportion of lead, even of nine parts of lead to one part of zinc, is quite effective in causing the precipitation. The same is true of aluminium and lead, which, however, do not afford a commercial combination, first, by reason of the cost of aluminium, and, second, on account of the difficulty of forming such an alloy. It is, however, desirable to combine all three of these metals, particularly in the proportions hereinbefore specified.

The advantage of employing lead in connection with the zinc is due to the fact that by their use the subsequent recovery of precious metals, as well as of the zinc, may be accomplished by a well-known and commonly-practiced procedure, while the recovery of the precious metals from zinc shavings is very difficult, and even in the hands of the most experienced refiner it is a matter of extreme difficulty to produce pure malleable gold bullion from the zinc slimes. The fundamental purposes of my alloy are, first, to provide a mixture or compound having a fusion-point so low that it may, owing to the large proportion of lead, be readily melted in a cast-iron refining-kettle; second, to deposit the gold on a metal (lead) with which it may readily alloy while undergoing fusion, and, third, to tie the precious metals to lead, for the reason that it is desirable to recover them finally through cupellation in order to eliminate the last traces of brittleness or shortness, which tend to produce volatile metals and metalloids, such as zinc, arsenic, and tellurium.

The advantage in employing aluminium is twofold. First, a small proportion of aluminium in the alloy causes it to act more energetically in precipitating, and, secondly, the presence of such a proportion of aluminium with lead and zinc, when fused, in the operations of either the Parkes or Balbach methods of refining, effects a more complete separation of both the zinc and the precious metals from the lead.

It may be added that my final refining procedure is based on Parkes's fundamental system of separating the precious metals and copper from lead containing them by allowing the fused alloy to drop in temperature below the fusing-point of zinc, thus bringing the zinc and precious metals contained in the lead to the surface to be removed by skimming, the skimmings to be subsequently retorted for the separation of residual lead and recovery of both zinc and precious metals and the precious metals to be finally cupelled and melted.

My improved alloy thus affords a product which is peculiarly suitable for purposes of refining and enables me to produce pure bullion in the use of the cyanid process by a procedure which is both well known and commercial, thereby removing a serious obstacle to the method of ore treatment which is in other respects successful and desirable in many localities.

What I claim as new, and desire to secure by Letters Patent, is—

1. The process of recovering, by precipitation, the precious metal, or metals, contained in a cyanogen-containing solution, which consists in subjecting said solution to contact with an alloy composed of lead and zinc and in which lead is the preponderating metal in weight, substantially as and for the purpose set forth.

2. The process of recovering, by precipitation, the precious metal, or metals, contained in a cyanogen-containing solution which consists in subjecting said solution to contact with an alloy composed of lead, zinc and aluminium, substantially as and for the purpose set forth.

WILLIAM A. KONEMAN.

In presence of—
  M. J. FROST,
  J. H. LEE.